(12) United States Patent
Li et al.

(10) Patent No.: US 6,504,582 B1
(45) Date of Patent: *Jan. 7, 2003

(54) SCRATCH RESISTANT DISPLAY AND METHOD OF MAKING SAME USING HOMEOTROPHIC LIQUID CRYSTAL SILANES

(75) Inventors: Chia-Yen Li, Andover; Frank Bottari, Acton, both of MA (US)

(73) Assignee: 3M Innovative Properties Co, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/165,404

(22) Filed: Oct. 2, 1998

(51) Int. Cl.$^7$ .................................................. G02F 1/13
(52) U.S. Cl. ........................................ 349/12; 349/122
(58) Field of Search .......................... 349/12, 122, 130, 349/131; 428/447, 448; 427/387

(56) References Cited

U.S. PATENT DOCUMENTS

| | | | |
|---|---|---|---|
| 3,560,385 A | 2/1971 | Roth | |
| 3,730,701 A | 5/1973 | Isquith et al. | |
| 3,860,709 A | 1/1975 | Abbott et al. | |
| 4,150,877 A | * 4/1979 | Kobalo et al. | 349/131 |
| 4,288,357 A | 9/1981 | Kanazawa et al. | 524/720 |
| 4,316,041 A | 2/1982 | Totten et al. | |
| 4,388,453 A | 6/1983 | Finkelmann et al. | |
| 4,422,732 A | 12/1983 | Ditzik | 359/315 |
| 4,496,482 A | 1/1985 | Totten et al. | |
| 4,527,862 A | * 7/1985 | Arakawa | 349/122 |
| 4,548,842 A | 10/1985 | Pohl | |
| 4,678,283 A | * 7/1987 | Kreuzer et al. | 349/131 |
| 4,730,904 A | 3/1988 | Pauluth et al. | |
| 4,774,028 A | 9/1988 | Imai et al. | |
| 4,844,986 A | 7/1989 | Karakelle et al. | |
| 4,847,120 A | 7/1989 | Gent | |
| 4,866,192 A | 9/1989 | Plueddemann et al. | |
| 4,911,536 A | 3/1990 | Ditzik | 349/22 |
| 4,940,602 A | 7/1990 | Taniguchi et al. | |
| 4,954,153 A | 9/1990 | Coleman et al. | |
| 4,985,286 A | 1/1991 | Kurita et al. | |

(List continued on next page.)

FOREIGN PATENT DOCUMENTS

| | | |
|---|---|---|
| EP | 0 846 715 | 6/1998 |
| EP | 0 877 027 | 11/1998 |
| GB | 1386876 | 5/1972 |
| GB | 1433303 | 2/1974 |
| JP | 1-256544 | 10/1989 |
| JP | 05266750 | 10/1993 |
| JP | 8-185560 | 7/1996 |
| JP | 2001-11376 | 1/2001 |

OTHER PUBLICATIONS

Uchida et al "Surface Alignment of Liquid Crystal" Liquid Cyrstals Application and Uses–vol. 3–pp 7–9, 1990.*

Kakn et al. "Surface–Produced Alignment of Liquid Crystals" Proceedings of the IEEE–vol. 61–No. 7–pp. 823–828, Jul. 1973.*

Haller "Alignment and Wetting properties of Nematic Liquids" Appl. Phys. Lett. vol. 24–No. 8–pp 349–351, Apr. 1974.*

J. Harrison and S. Perry, Friction in the Presence of Molecular Lubricants and Solid/Hard Coatings, MRS Bulletin 1998.

Frederic J. Kahn, "Orientation of liquid cyrstals by surface coupling agents", American Institute of Physics 1973 vol. 22, No. 8.

*Primary Examiner*—William L. Sikes
*Assistant Examiner*—Tai Duong
(74) *Attorney, Agent, or Firm*—Robert J. Pechman

(57) ABSTRACT

A scratch resistant display includes a substrate; an active portion on one surface of said substrate including at least a conductive layer; and a homeotropic organosilane layer deposited on the said active portion for reducing energy dissipation of an object contacting the display.

5 Claims, 3 Drawing Sheets

U.S. PATENT DOCUMENTS

| | | |
|---|---|---|
| 5,115,487 A | 5/1992 | Blyler, Jr. et al. |
| 5,266,222 A * | 11/1993 | Willis et al. ............ 252/49.006 |
| 5,335,373 A | 8/1994 | Dangman et al. .............. 2/167 |
| 5,411,585 A | 5/1995 | Avery et al. |
| 5,437,817 A | 8/1995 | Kondou et al. |
| 5,831,700 A | 11/1998 | Li et al. |
| 5,954,869 A * | 9/1999 | Elfersy et al. ......... 106/287.16 |

* cited by examiner

SCRATCH RESISTANT DISPLAY AND METHOD OF MAKING SAME USING HOMEOTROPHIC LIQUID CRYSTAL SILANES

FIELD OF INVENTION

This invention relates to scratch resistant surfaces, and more particularly to a scratch resistant display such as a computer touch screen panel.

BACKGROUND OF INVENTION

Surface scratches affect product appearance and function in detrimental ways. This is especially true in the optics and display industry where the surface is coated with a layer or layers intended to provide a specific function such as a filter or dielectric coating. In particular, computer touch screen panels are especially vulnerable. Touch screens have become more and more popular as a input device for computers. A touch is sensed by a touch screen when a finger or a stylus comes into contact with the outermost surface of the touch screen panel. The contact is translated into x and y coordinates of the finger or stylus on the panel. Since the data entry is based on contact, touch screen panels are inherently susceptible to scratches.

A scratch is made by a plastic deformation on a surface. The force that produces a scratch can be divided into two components: a component that is perpendicular to the surface and another component parallel to the surface. The component perpendicular to the surface produces a plastic deformation on the surface and the component parallel to the surface extends the damage by plowing material out of the way. The damage due to the perpendicular component is dependent upon on the friction of the contact surfaces. The higher the friction coefficient, the larger the perpendicular component and thus the more damage which results.

Two of the most widely employed approaches for providing scratch resistance to a surface are the introduction of lubricants and solid/hard protective coatings applied to the outer most layer of the touch screen. The introduction of a lubricant reduces the energy dissipation along the surface attributable to the vertical component which would otherwise cause damage to the surface. Solid/hard coatings are intended to avoid the initial plastic deformation in the first place. Neither lubricants nor solid/hard protective coatings, however, provide sufficient scratch resistance to touch screen panels.

Non-homeotropic organosilanes have long been used as coupling agents which provide a stable bond between dissimilar surfaces. It is an important characteristic of coupling agents that they form a chemical bond to surface materials. Most of the anti-scratch surface treatments involve providing hard coatings although some use organosilanes to improve lubricity of glass surfaces.

Several other families of organosilanes have been tested. These include alkylsiloxanes, alkylaminosiloxanes, perfluoroalkylsiloxanes. None of these organosilanes, however, have been found to improve scratch resistance to the extent required for touch screen panels.

Touch screen panels can be found everywhere from ATM's to casinos to bar room video games. These environments are extremely harsh and susceptible to scratching from coins, bottles and glasses as well as being exposed to harsh outdoor elements where they are subject to airborne debris and even vandalism. Depending on the severity of the scratch, the function of the display may be greatly affected.

SUMMARY OF INVENTION

It is therefore an object of this invention to provide a display which is scratch resistant.

It is a further object of this invention to provide such a scratch resistant display which is durable and long lasting.

It is a further object of this invention to provide a scratch resistant surface which is simpler to produce and more durable than current hard coatings.

It is a further object of this invention to provide such a scratch resistant surface which can be applied to most any coated surface.

The invention results from the realization that a truly durable and long lasting scratch resistant display can be obtained by applying a homeotropic organosilane to the outer most surface of the display to reduce energy dissipation of an object as the object is dragged transverse to the surface.

This invention features a scratch resistant display comprising a substrate, an active portion on one surface of the substrate including at least a conductive layer, and a homeotropic organosilane layer deposited on the active portion for reducing energy dissipation of an object contacting the display.

In a preferred embodiment the active portion may include a protective layer on the conductive layer. The active portion may include a deformable conductive layer on the conductive layer. The organosilane may include a liquid crystal silane. The substrate may be transparent. The transparent substrate may be glass. The display may be a touch screen panel. The first conductive layer may include a tin oxide. There may be a second conductive layer disposed on the substrate on a surface opposite the active portion. The first and the second conductive layers may be tin oxide.

The invention also features a scratch resistant touch screen panel having an insulative substrate, a conductive layer disposed on one surface of the insulative substrate, a protective layer disposed on the conductive layer, and a homeotropic organosilane layer disposed on the protective layer for reducing energy dissipation of an object contacting the touch screen panel.

The invention also features a scratch resistant touch screen panel having an insulative substrate, an active portion disposed on the substrate, the active portion having at least a first conductive layer disposed adjacent the insulative substrate, a deformable conductive layer adjacent and spaced from the first conductive layer, and a protective layer disposed on the deformable conductive layer. There is a homeotropic organosilane layer disposed on the active portion for reducing energy dissipation of an object contacting the touch screen panel.

The invention also features a method for producing a scratch resistant coated transparent article by combining a transportation medium and a homeotropic organosilane, and applying the combination to a coated transparent article to be protected.

In a preferred embodiment the organosilane may include a liquid crystal silane. The article may be heated, after applying the combination, to a temperature below the disassociation temperature of the combination. The transportation medium may include water. The transportation medium may include alcohol.

DISCLOSURE OF PREFERRED EMBODIMENT

Other objects, features and advantages will occur to those skilled in the art from the following description of a preferred embodiment and the accompanying drawings, in which.

Figure 1:
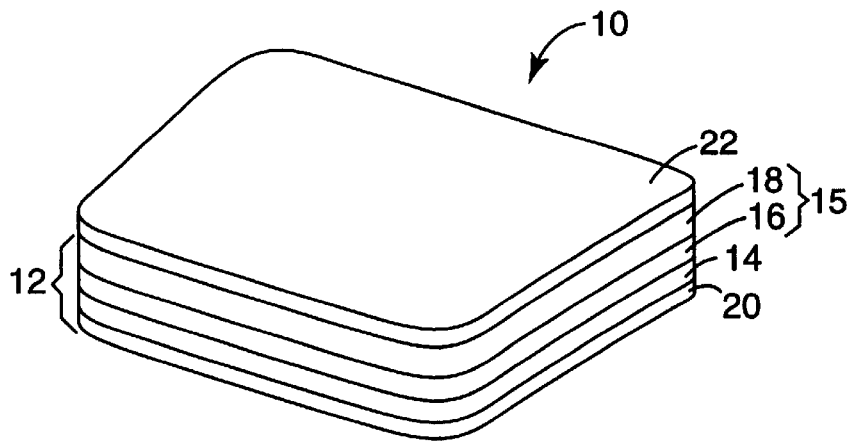
FIG. 1 is a three dimensional view of the scratch resistant display according to the present invention in which the display is a capacitive touch screen panel.

Scratch resistant display 10, FIG. 1 according to the present invention may be a screen display such as, for example, a computer touch screen panel, available from Microtouch Systems, Inc., Methuen, Mass. made up of several different layers.

Touch screen panel 12 typically includes insulative substrate 14, such as glass, plastic or another transparent medium and active portion 15 on substrate 14. Active portion 15 typically includes transparent conductive layer 16 deposited directly on substrate 14. Layer 16 is typically a tin oxide layer having a thickness of twenty to sixty nanometers and may be deposited by sputtering, vacuum deposition and other techniques known in the art. The thickness of the layers is exaggerated in the figure for illustrative purposes only and is not intended to represent the layers to scale. Conductive layer 16 may also include a conductive polymeric material or a conductive organic-inorganic composite.

A conductive pattern, not shown, is typically disposed about the perimeter of conductive layer 16 to provide a uniform electric field throughout conductive layer 16 in order to establish the point of contact between the screen and a finger or stylus.

Active portion 15 may also include protective layer 18 deposited over conductive layer 16 to provide abrasion resistance to protect conductive layer 16. Protective layer 18 may be a layer of an organosiloxane formed by applying to the article a solution comprising methyltriethoxysilane, tetraethylorthosilicate, isopropanol and water.

Second conductive layer 20 may be provided to shield display 10 from noise which may result from the electric circuits of a display unit, not shown, to which display 10 may be attached and may similarly include a tin oxide layer deposited in a similar manner as discussed with reference to conductive layer 16. However, conductive layer 20 is not a necessary limitation of the invention as display 10 can function effectively without it.

Scratch resistant layer 22 in accordance with this invention is applied to active portion 15, usually on protective layer 18 or even directly to conductive layer 16 if protective layer 18 is not present or to the outermost layer if additional layers are present to reduce energy dissipation of an object contacting display 10 and thereby minimizing or preventing damage to display 10. Scratch resistant layer 22 preferably includes a homeotropic liquid crystal silane compound.

Figure 2:
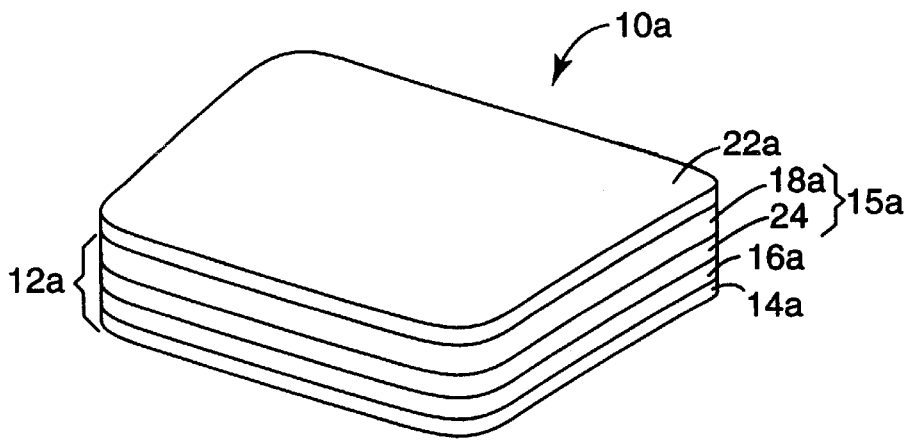
FIG. 2 is a three dimensional view, similar to FIG. 1, in which the display is a resistive touch screen panel.

Display 10a, FIG. 2 may include, for example, a resistive computer touch screen 12a available from Microtouch Systems, Inc., Methuen, Mass., Elo TouchSystems, Freemont, Calif., or Dynapro, Vancouver, British Columbia, which includes insulative substrate 14a and conductive layer 16a, similar to FIG. 1. Protective layer 18a may include a hard coating which protects and supports deformable conductive layer 24 interposed between conductive layer 16a and protective layer 18a. As display 10a is contacted by a finger or stylus deformable conductive layer 24 compresses and makes contact with conductive layer 16a to indicate the position of the contact. Scratch resistant layer 22a is applied on layer 18a and also preferably includes a homeotropic liquid crystal silane compound. 1.

Liquid crystal silanes are in the family of organosilanes. The general formula for an organosilane is

where

R=organofunctional group bonded to the silicon atom;

X=hydrolyzable groups, such as a halogen or an alkoxy group, attached to the silicon atom;

n=1 or 2; and m=4−n.

However, liquid crystal silanes have the general formula:

where p>1;

X=is selected from the group Cl, Br, alkoxy, hydroxyl radicals, and mixtures thereof, which are hydrolyzable to form a silanol; and Z=a compound selected from the group alkyl quaternary ammonium salts, alkyl sulfonium salts, alkyl phosphonium salts, substituted biphenyl compounds, terphenyl compounds, azoxybezenes, cinnamates, pyridines, benzoates, and mixtures thereof.

Liquid crystal silanes form durable and long lasting bonds to surfaces such as glass, plastic, ceramic, semiconductors, metal, organic polymer coated substrates or inorganic coated substrates. Theses silanes have a molecular structure which is highly ordered. Homeotropic liquid crystal silanes, in addition to being highly ordered, bond such that the major axes of the carbon chains which make up the liquid crystal silanes spontaneously align or tend to align oriented perpendicular to the surface to which they are bonding. Because the alignment is perpendicular, the resultant film has a higher packing density, maximizing Van der Waal forces and thus effectively preventing scratches.

A good example of a liquid crystal silane having such properties is Dow Corning 5700, available from Dow Corning, Midland, Mich., which contains eight (8) weight percent chloropropyl trimethoxysilane, forty-two (42) weight percent octadecylaminodimethyl trimethoxysilylpropyl ammonium chloride, and fifty (50) weight percent methyl alcohol.

Another liquid crystal silane is Dow Corning 5772 which contains fifteen (15) weight percent chloropropyl trimethoxysilane, seventy two (72) weight percent octadecylaminodimethyl trimethoxysilylpropyl ammonium chloride, one (1) weight percent diethyl octadecylamine and twelve (12) weight percent methyl alcohol.

A similar liquid crystal silane to Dow Corning 5700 is Gelest SIO6620.0, available from Gelest, Inc, Tullytown, Pa., which contains sixty (60) weight percent octadecylaminodimethyl trimethoxysilylpropyl ammonium chloride, three (3) to five (5) weight percent Cl(CH$_2$)$_3$Si(OMe)$_3$, and thirty five (35) to thirty seven (37) weight percent methanol.

A transportation medium is typically used to dilute the homeotropic liquid crystal silane as well as to transport the silane to the surface to be protected. Small molecule alcohols such as methanol, ethanol, and isopropanol are the preferred vehicle for silane applications, however, water may also be used as a transportation medium. Additionally, water reacts with organosilanes to form hydrolyzed products or silanols.

It is also known that hydrolysis reactions between water and organosilanes can be catalyzed in an acidic solution. Thus, a stabilizing agent may be used so that the silanols are stable against self-condensation reactions which may cause precipitation of the solution if the solution is basic.

The bond formed between the silanol and the substrate is accomplished through a cross condensation reaction. The cross condensation reaction between a silanol and a molecule on the substrate is generally slow. This reaction can be accelerated by heating the freshly treated substrate at temperatures up to 150° C. for several minutes, typically at least three (3) minutes. However, if the temperature exceeds 150° C. the silane dissociates with the transportation medium. Typically, heating the substrate to between 100 and 150° C. for at least three (3) minutes is sufficient to form permanent bonds between the liquid crystal silane and the substrate.

An organosilane primer layer may be used to enhance the bonding between the substrate and the liquid crystal silane. Generally, an organosilane layer contains very high concentration of hydroxyl groups and high angle Si—O—Si bonds. These are the bonding sites for hydrolyzed liquid crystal silane. Permanent bonding is formed by condensation reactions between the hydrolyzed liquid crystal silane molecules and the organosilane layer. The Si—O—Si bonds are known to be extremely durable.

As stated above in the Background of the Invention, a scratch is formed when a plastic deformation occurs and material is plowed away. As the object such as a finger, stylus, bottle, coin or other hard object moves across the surface, energy is dissipated as the result of frictional forces between the contacting surfaces. Thus, if energy dissipation is reduced, there is no plowing and thus no scratching.

Figure 3:
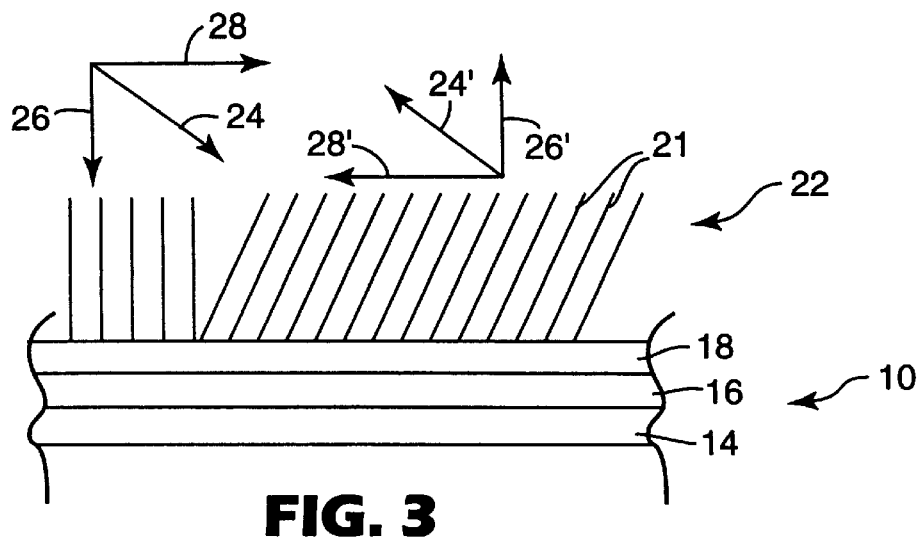
FIG. 3 is a representation of the scratch resistant display according to this invention demonstrating how the individual carbon chains of the liquid crystal silanes align and are oriented perpendicular to the display and how the liquid crystal silane reacts to an object contacting the display.

The force of an object contacting display 10, FIG. 3, is represented by arrow 24 which may be broken down into vertical component 26 and horizontal component 28.

However, liquid crystal silane 22 is made up of individual carbon chains 21, shown greatly enlarged, which align or tend to align perpendicular to protective layer 18. As chains 21 are bent due to contact by an object in a direction corresponding to the direction of arrow 24, the force of the contact is met with an opposing force represented by arrow 24' which can be broken down into components 26' and 28', which oppose vertical and horizontal force components 26 and 28, respectively. Moreover, due to the higher packing density, an object is met with an even greater opposing force.

The higher packing density of liquid crystal silanes is due to their highly ordered structure. Linear carbon chains of homeotropic organosilanes are tightly packed perpendicularly to the surface thereby providing greater opposing forces than normal lubricants to counter damaging forces. This highly ordered structure presents less structural defects, such as deformation of extended chain structures, and therefore provides better scratch resistance than normal lubricants. Homeotropic liquid crystal silanes maximize the thickness of the protective layer because their axis is perpendicular to the surface.

In contrast, non-homeotropic liquid crystal silanes cannot form this highly ordered layer and thus provide much less protection to the surface from scratches.

Thus, because the force of the object is opposed by the liquid crystal silane as a result of the homeotropic orientation of the silane, less frictional contact takes place and thus less energy dissipation occurs thereby minimizing damage which may otherwise result from the contact of a finger, stylus or other hard object on the display.

Treated articles not only showed an increase in scratch resistance, but have further shown improved antistatic properties, and easier cleaning.

EXAMPLE 1

Figure 4:
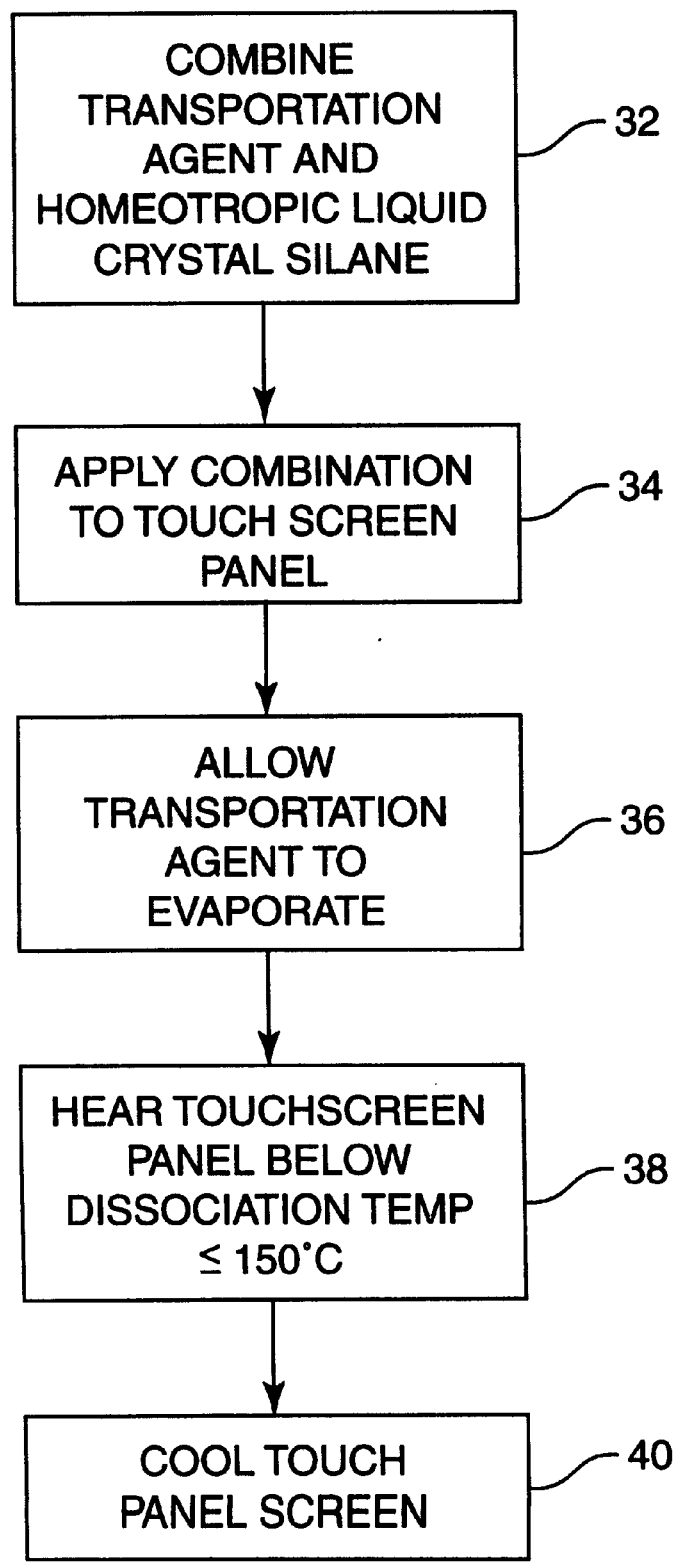
FIG. 4 is a block diagram of the method of providing a scratch resistant display according to the present invention.

An amount of one (1) weight percent water, as a hydrolyzing agent and transportation agent was combined with ninety seven point nine (97.9) weight percent isopropyl alcohol, also as a transportation agent, and one point one (1.1) weight percent Dow Corning 5700, Step 32, FIG. 4. The water was first added to the alcohol and mixed by mechanical stirring to obtain a homogeneous, clear solution. The Dow Corning 5700 compound was then added to this solution by mechanical stirring and stirred to obtain a homogeneous solution. The hydrolysis reaction took place instantaneously.

The combination was applied to the outer most surface of a capacitive touch screen panel, Step 34, obtained from Microtouch Systems, Inc., similar to touch screen 12, FIG. 1, by spraying the solution onto the screen and wiping to uniformly distribute the solution. However, this is not a necessary limitation of the invention as the solution may be applied in any number of methods such as brushing, dipping, wiping, and other methods known in the art. The transportation medium was allowed to evaporate, Step 36, and the touch screen was subsequently heated to a temperature of 120° C. for a period of three (3) minutes, Step 38. Heating cures the film and facilitates bonding between the protective layer and the liquid crystal silane layer. The touch screen was then cooled, Step 40.

After the application process, the capacitive touch screen proved very scratch resistant. A Balance Beam Scrape Adhesion Mar Tester, Model PA-2197, available from Paul N. Gardner Co., Inc., was used to measure scratch resistance of the touch screen panel prior to and after treatment.

The tester exceeds requirements of ASTM D-2197 standard test methods for adhesion of organic coatings by scrape adhesion and meets ASTM D-5178 standard test methods for mar resistance of organic coatings. The tester measures the amount of weight necessary to make a scratch by a stylus. A loop stylus, produced from $\frac{1}{16}$ inch steel having an outside diameter of 0.128 inches and heat treated to a hardness of 55–61 Rockwell, was used to make a scratch.

A scratch is defined by a functional failure of the protective layer 18, FIG. 1. In other words, protective layer 18 was removed to expose conductive layer 16.

Prior to treatment, a scratch was made by a load of only 50 grams. However, after treatment, the tester could not make a scratch at the maximum load of 10,500 grams. This is an improvement in scratch resistance of at least 210 times.

EXAMPLE 2

Figure 5:
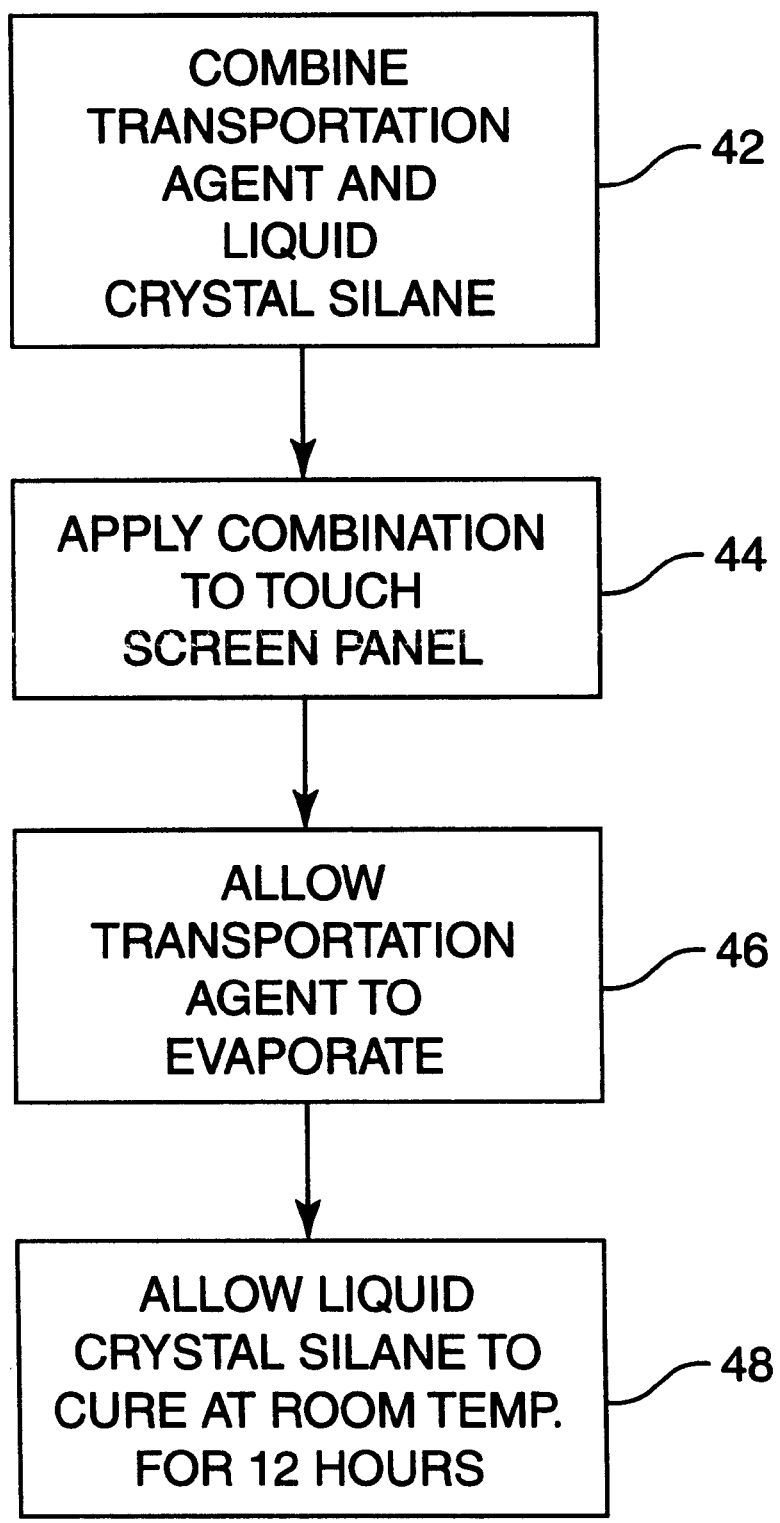
FIG. 5 is a block diagram, similar to FIG. 4, in which the liquid crystal silane is cured without heat.

An amount of one (1) weight percent water was combined with ninety eight (98) weight percent isopropyl alcohol and one (1) weight percent Gelest SIO6620.0, Step 42, FIG. 5, in the manner as discussed in EXAMPLE 1.

The combination was applied to a resistive touch screen panel, Step 44, obtained from Microtouch Systems, Inc., similar to touch screen 12a, FIG. 2, by spraying the solution onto the touch screen panel and wiping to uniformly distribute the solution. The transportation medium was allowed to evaporate, Step 46, and the film was left to cure 20 at room temperature for approximately seventy two (72) hours, Step 48.

The same tester as discussed above was used to evaluate the scratch resistance characteristics of the touch screen panel. A scratch was defined as the delamination of protective layer 18a.

Prior to treatment, a scratch was produced with a load of only 250 grams. However, after treatment, a load of 6,000 gram was required to make a scratch. This is an improvement in scratch resistance of up to 24 times.

EXAMPLE 3

An amount of one (1) weight percent water was combined with ninety eight (98) weight percent isopropyl alcohol and one (1) weight percent Dow Corning 5772, Step 42, FIG. 5, in the manner as discussed in EXAMPLE 1.

The solution was applied to a capacitive touch screen panel, Step 44, similar to touch screen 12, FIG. 1, obtained from Microtouch Systems, Inc. is a manner similar to that in EXAMPLE 2, that is, after evaporation of the transportation medium, Step 46, no heat was applied to the display and the film was allowed to cure overnight, Step 48.

Scratch testing was done by using a Micro Scratch Tester, available from CSEM Instruments. The test involved generating a controlled scratch with a hard tip on the touch screen panel. A tungsten carbide indenter having a radius of 10 microns was drawn across the panel surface under a progressive load. The critical loads are detected very precisely by means of an acoustic sensor attached to the load arm and by optical microscopy.

The critical load to make a scratch prior to treatment of the touch screen was 0.55N. However, after treatment, the load required to make a scratch was 1.8N.

The popularity of touch screen panels has caused them to appear in a variety of locations subject to a variety of environments. Apart from the inherent threats of scratching through normal, traditional use, they are now further subject to non-traditional hazards such as scratches from bottles, coins and airborne debris as well as vandalism.

Through the application of a homeotropic liquid crystal silane to the outer most surface, the damage which would normally occur in these harsh environments, in addition to inherent damage, is dramatically reduced and even prevented completely. Prior lubricants and hard coatings, while somewhat effective, cannot provide the scratch resistance that the present invention demonstrates.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A scratch resistant touch screen comprising:
   a substrate;
   an active area on the substrate;
   a siloxane protective layer on the active area of the substrate; and
   a homeotropic organosilane scratch resistant layer chemically bonded to the siloxane protective layer.

2. A scratch resistant display comprising:
   a substrate;
   an active portion on one surface of said substrate including at least a first conductive layer and a protective layer on said first conductive layer, wherein said protective layer includes an organosiloxane; and
   a homeotropic organosilane layer deposited on said active portion for reducing energy dissipation of an object contacting said display.

3. A method of applying a scratch resistant coating to a touch screen, the method comprising:
   depositing a siloxane material in a layer on the touchscreen to protect the touchscreen;
   activating the siloxane material; and
   while the siloxane material is still activated, applying a homeotropic organosilane compound to the siloxane layer so that a chemical bond is formed between the siloxane layer and the homeotropic organosilane compound and a permanently applied scratch resistant coating is present on the touch screen.

4. The method of claim 3 in which activating includes raising the temperature of the touchscreen.

5. The method of claim 3 in which the siloxane material includes an organosiloxane compound.

* * * * *